(12) United States Patent
Vandike et al.

(10) Patent No.: US 9,786,963 B2
(45) Date of Patent: Oct. 10, 2017

(54) VEHICLE HEATING/COOLING SYSTEM WITH CONSOLIDATED HEATING/COOLING CORE

(71) Applicant: DEERE & COMPANY, Moline, IL (US)

(72) Inventors: Nathan R Vandike, Geneseo, IL (US); Adam J Beals, Davenport, IA (US)

(73) Assignee: Deere & Company, Moline, IL (US)

( * ) Notice: Subject to any disclaimer, the term of this patent is extended or adjusted under 35 U.S.C. 154(b) by 334 days.

(21) Appl. No.: 13/890,814

(22) Filed: May 9, 2013

(65) Prior Publication Data

US 2014/0332179 A1    Nov. 13, 2014

(51) Int. Cl.

| | |
|---|---|
| *B60H 3/00* | (2006.01) |
| *H01M 10/613* | (2014.01) |
| *B60H 1/00* | (2006.01) |
| *F28D 7/10* | (2006.01) |
| *F28D 7/00* | (2006.01) |
| *F01P 3/20* | (2006.01) |
| *F28D 21/00* | (2006.01) |

(52) U.S. Cl.
CPC .... *H01M 10/5004* (2013.01); *B60H 1/00278* (2013.01); *B60H 1/00342* (2013.01); *B60H 1/00392* (2013.01); *F01P 3/20* (2013.01); *F28D 7/0083* (2013.01); *F28D 7/103* (2013.01); *F28D 7/106* (2013.01); *B60H 2001/00307* (2013.01); *F01P 2050/24* (2013.01); *F01P 2060/08* (2013.01); *F28D 2021/008* (2013.01)

(58) Field of Classification Search
CPC ............ B60H 1/00278; B60H 1/00342; B60H 1/00392; B60H 1/004; B60H 1/3222; B60H 2001/00307; B60K 11/02; F28D 7/10; F28D 7/103; F28D 7/106
USPC ................................ 165/41, 42, 43, 140, 141
See application file for complete search history.

(56) References Cited

U.S. PATENT DOCUMENTS

| | | | |
|---|---|---|---|
| 3,700,165 A * | 10/1972 | Beehler .............. | B60H 1/00442 236/101 A |
| 6,260,376 B1 * | 7/2001 | Khelifa et al. ................... | 62/435 |
| 6,467,286 B2 * | 10/2002 | Hasebe et al. ................... | 62/185 |
| 2006/0005941 A1 * | 1/2006 | Watanabe et al. .............. | 165/41 |

(Continued)

FOREIGN PATENT DOCUMENTS

| | | |
|---|---|---|
| EP | 1990221 A1 | 11/2008 |
| GB | 692885 A | 6/1953 |

OTHER PUBLICATIONS

European Search Report issued in counterpart application No. 14165610.8, dated Feb. 2, 2015 (6 pages).

*Primary Examiner* — Travis Ruby
(74) *Attorney, Agent, or Firm* — Rathe Lindenbaum LLP (57) ABSTRACT

A vehicle heating/cooling system for a vehicle comprises an internal combustion engine coupled to a closed engine coolant circuit to recirculate engine coolant therethrough; a refrigerant compressor coupled to a closed refrigerant circuit to recirculate refrigerant therethrough, wherein the refrigerant compressor is coupled to the internal combustion engine to be driven thereby; a closed thermally regulated fluid circuit to recirculate thermally regulated fluid therethrough; and a consolidated heating/cooling core coupled to the closed engine coolant circuit, to the closed refrigerant circuit and to the closed thermally regulated fluid circuit.

10 Claims, 3 Drawing Sheets

(56) References Cited

U.S. PATENT DOCUMENTS

2008/0041071 A1 2/2008 Itoh
2012/0104843 A1* 5/2012 Fuchtner .................. 307/9.1

* cited by examiner

FIG. 1

VEHICLE HEATING/COOLING SYSTEM WITH CONSOLIDATED HEATING/COOLING CORE

FIELD

This invention relates to vehicle heating/cooling systems. More particularly, it relates to heat exchangers for vehicle heating/cooling systems. Even more particularly, it relates to consolidated heating/cooling cores for such heat exchangers.

BACKGROUND

Vehicle heating/cooling systems typically employed separate heat exchangers for heating circuits and for cooling circuits. Providing the separate heat exchangers requires additional space and plumbing, including additional valves and conduits to direct the flow to the separate heat exchangers in the system.

This is a particular problem for vehicles such as hybrid vehicles that employ electric batteries to drive the vehicle. These electric batteries must be maintained within a narrow range of temperatures in order to keep them operating at peak efficiency and without damage.

It is an object of this invention to provide an improved vehicle heating/cooling system in which a heat exchanger with a consolidated heating/cooling core is employed to reduce space and maintain temperatures at appropriate levels.

It is also an object of this invention to provide a consolidated heating/cooling core for the vehicle heating/cooling system.

SUMMARY

In accordance with one aspect of the invention a vehicle heating/cooling system for a vehicle is provided comprising an internal combustion engine coupled to a closed engine coolant circuit to recirculate engine coolant therethrough; a refrigerant compressor coupled to a closed refrigerant circuit to recirculate refrigerant therethrough, wherein the refrigerant compressor is coupled to the internal combustion engine to be driven thereby; a closed thermally regulated fluid circuit to recirculate thermally regulated fluid therethrough; and a consolidated heating/cooling core coupled to the closed engine coolant circuit, to the closed refrigerant circuit and to the closed thermally regulated fluid circuit.

The consolidated heating/cooling core may define a first closed path for conducting the engine coolant therethrough, and the consolidated heating/cooling core may define a second closed path for conducting the refrigerant therethrough, and the consolidated heating/cooling core may define a third closed path for conducting the thermally regulated fluid therethrough.

The first closed path, the second closed path and the third closed path may be defined by a plurality of cylinders.

The plurality of cylinders may comprise a first cylinder, a second cylinder, and a third cylinder, and each cylinder of the plurality of cylinders may have an inner surface and an outer surface, and the first cylinder may be surrounded by the second cylinder which may be surrounded by the third cylinder.

At least one of the first closed path and the second closed path may be defined by an inner surface of the first cylinder, and at least another of the first closed path and the second closed path may be defined by a space between the outer surface of the second cylinder and the inner surface of the third cylinder, and the third closed path may be defined by the space between the outer surface of the first cylinder and the inner surface of the second cylinder.

The plurality of cylinders may comprise a first cylinder, a second cylinder, and a third cylinder and each cylinder of the plurality of cylinders may have an inner surface and an outer surface, and the first cylinder may be surrounded by the second cylinder and the third cylinder may be surrounded by the second cylinder.

The first closed path may be defined by an inner surface of the first cylinder, and the second closed path may be defined by an inner surface of the third cylinder, and the third closed path may be defined by a space between the outer surface of the first cylinder and the inner surface of the second cylinder, and the third closed path may be defined by the space between the outer surface of the third cylinder and the inner surface of the second cylinder.

The plurality of cylinders may be concentric.

Each cylinder of the plurality of cylinders may be nested within at least another cylinder of the plurality of cylinders.

The closed thermally regulated fluid circuit may pass through a thermally regulated load, and the thermally regulated load may comprise a battery.

The closed thermally regulated fluid circuit may pass through a thermally regulated load, and further wherein the thermally regulated load comprises an inverter.

The consolidated heating/cooling core may be a rigid, unitary body.

A fluid flow direction through one of the first closed path, the second closed path and the third closed path may be opposite to a fluid flow direction through the other two of the first closed path, the second closed path and the third closed path.

In accordance with another aspect of the invention, a consolidated heating/cooling core is provided for a vehicle heating/cooling system comprising a closed engine coolant circuit for conducting engine coolant therethrough, a closed refrigerant circuit for conducting refrigerant therethrough, and a closed thermally regulated fluid circuit for conducting thermally regulated fluid therethrough, the consolidated heating/cooling core comprising: a first closed path for conducting the engine coolant therethrough; a second closed path for conducting the refrigerant therethrough; and a third closed path for conducting the thermally regulated fluid therethrough.

The first closed path, the second closed path and the third closed path may be defined by a plurality of cylinders.

The plurality of cylinders may comprise a first cylinder, a second cylinder, and a third cylinder, and each cylinder of the plurality of cylinders may have an inner surface and an outer surface, and the first cylinder may be surrounded by the second cylinder which may be surrounded by the third cylinder.

At least one of the first closed path and the second closed path may be defined by an inner surface of the first cylinder, and at least another of the first closed path and the second closed path may be defined by a space between the outer surface of the second cylinder and the inner surface of the third cylinder, and the third closed path may be defined by the space between the outer surface of the first cylinder and the inner surface of the second cylinder.

The plurality of cylinders may comprise a first cylinder, a second cylinder, and a third cylinder and each cylinder of the plurality of cylinders may have an inner surface and an outer surface, and the first cylinder may be surrounded by the second cylinder and the third cylinder may be surrounded by the second cylinder.

The first closed path may be defined by an inner surface of the first cylinder, and the second closed path may be defined by an inner surface of the third cylinder, and the third closed path may be defined by a space between the outer surface of the first cylinder and the inner surface of the second cylinder, and the third closed path may be defined by the space between the outer surface of the third cylinder and the inner surface of the second cylinder.

Each cylinder of the plurality of cylinders may be concentric with another cylinder of the plurality of cylinders.

DETAILED DESCRIPTION

Figure 1:
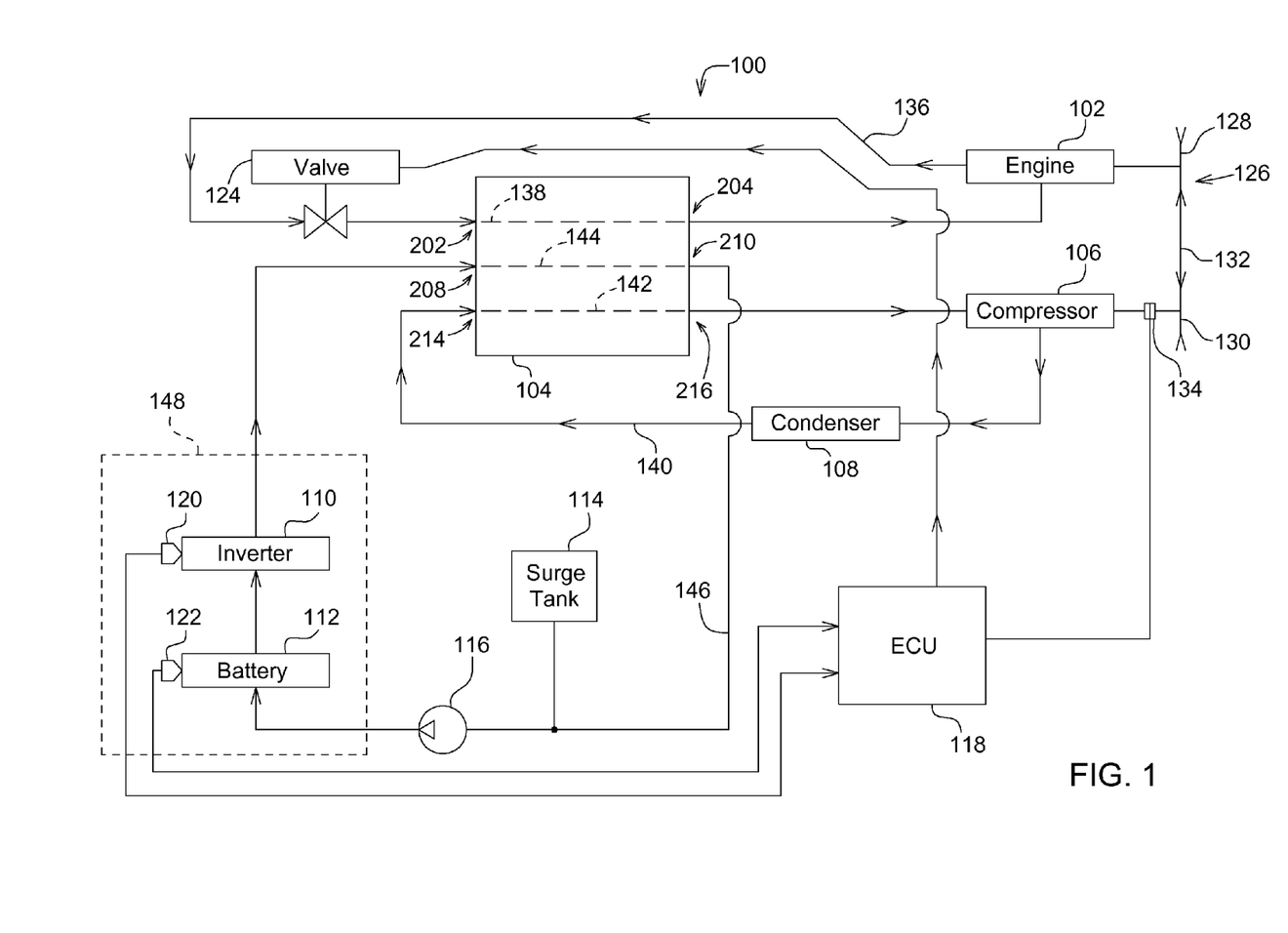
FIG. 1 is a schematic diagram of a vehicle heating/cooling system employing a consolidated heating/cooling core in accordance with the present invention.

In FIG. 1, a vehicle heating/cooling system 100 is shown which comprises an internal combustion engine 102, a consolidated heating/cooling core 104, a refrigerant compressor 106, a refrigerant condenser 108, an inverter 110, a battery 112, a surge tank 114, a pump 116, an electronic control unit (ECU) 118, a first temperature sensor 120, a second temperature sensor 122, and a solenoid valve 124.

Engine 102 is an internal combustion engine. It may be diesel or gasoline. Engine 102 is coupled to and drives a refrigerant compressor 106. Refrigerant compressor 106 is a refrigeration compressor. Engine 102 drives compressor 106 via a belt and pulley arrangement 126 that couples the two together. A pulley 128 on the engine is coupled to a pulley 130 that is drivingly engaged to the refrigerant compressor 106. The two are joined together by a belt 132. An electrically actuated clutch 134 is coupled to and between the refrigerant compressor 106 and the pulley 130. Whenever the electrically actuated clutch 134 is engaged, the pulley 130 drives the refrigerant compressor 106. When the electrically actuated clutch 134 is disengaged, the refrigerant compressor 106 idols and is not driven and the pulley 130 turns freely.

Engine coolant is transmitted through a closed engine coolant circuit 136 by a pump internal to the engine 102 to conduct hot engine coolant through the closed engine coolant circuit 136. The solenoid valve 124 is disposed in the closed engine coolant circuit 136 to regulate the flow of engine coolant through the closed engine coolant circuit 136. When the solenoid valve 124 is closed, the hot engine coolant is not conducted through the closed engine coolant circuit 136. When the solenoid valve 124 is open, hot engine coolant is conducted through the closed engine coolant circuit 136.

Figures 2, 3:
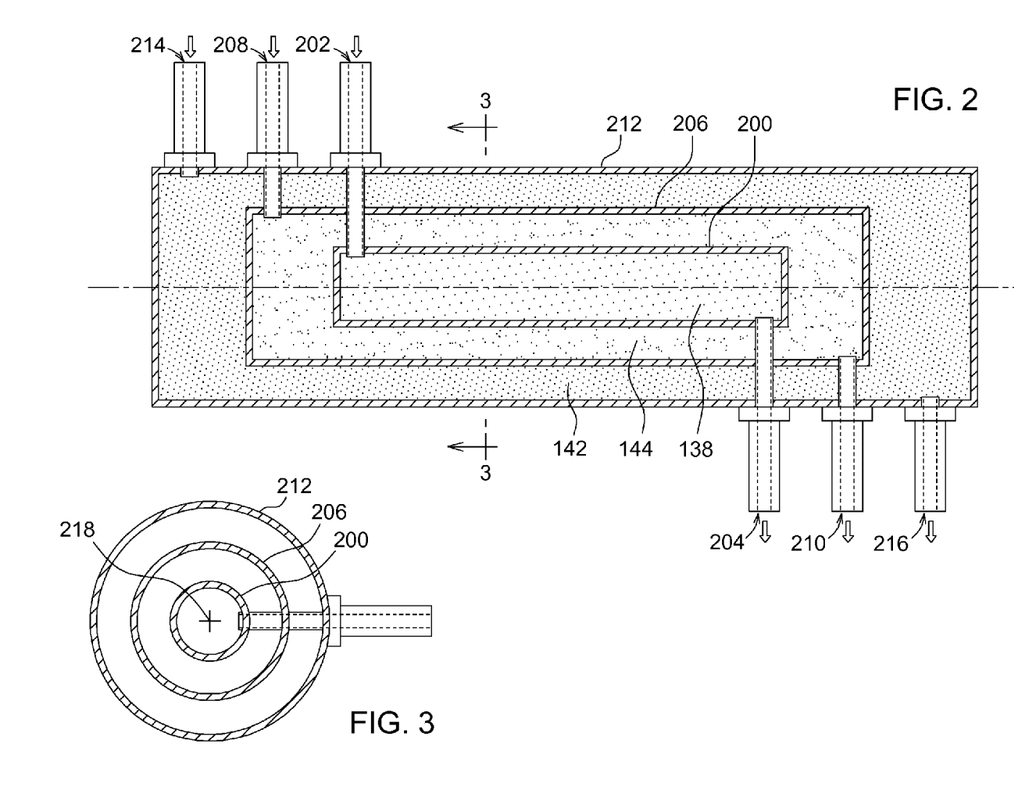
FIG. 2 is a cross-sectional view of a first embodiment of the consolidated heating/cooling core for the vehicle heating/cooling system of FIG. 1 taken along its longitudinal centerline.
FIG. 3 is a cross-sectional view of the embodiment of FIG. 2 taken at section line 3-3 in FIG. 2.
Figure 4:
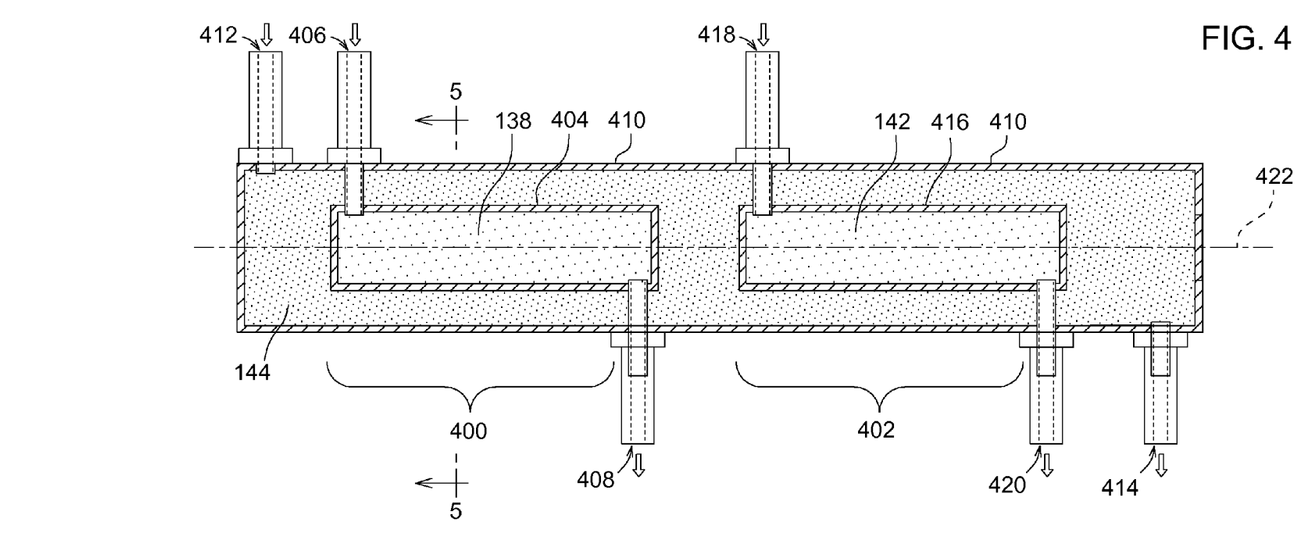
FIG. 4 is a cross-sectional view of a second embodiment of the consolidated heating/cooling core for the vehicle heating/cooling system of FIG. 1 taken along its longitudinal centerline.

The consolidated heating/cooling core 104 is disposed in the closed engine coolant circuit 136 as well to conduct heat energy from the hot engine coolant to one of the other liquid media passing through the consolidated heating/cooling core 104. The consolidated heating/cooling core 104 is a rigid unitary body as best shown in FIG. 2 and FIG. 4.

The consolidated heating/cooling core 104 conducts the hot engine coolant through a first closed path 138. The first closed path 138 is considered closed because it prevents the hot engine coolant from being mixed with the other fluid media passing through the consolidated heating/cooling core 104, while permitting heat energy contained in the hot engine coolant to be communicated to a thermally regulated fluid passing through the consolidated heating/cooling core 104. Having passed through the consolidated heating/cooling core 104, the now-cooler engine coolant is then conducted through the remainder of the closed engine coolant circuit 136 and back to the engine 102, thus completing the closed engine coolant circuit 136.

Refrigerant is compressed by refrigerant compressor 106 and is transmitted through a closed refrigerant circuit 140. The closed refrigerant circuit 140 conducts the now-compressed refrigerant into the refrigerant condenser 108, in which the thermal energy contained in the refrigerant is removed and the refrigerant is condensed into a liquid.

The now-condensed liquid refrigerant is then conducted further through the closed refrigerant circuit 140 and into the consolidated heating/cooling core 104. The liquid refrigerant vaporizes in the consolidated heating/cooling core 104 absorbing heat from the thermally regulated fluid passing through the consolidated heating/cooling core 104. Once the refrigerant has absorbed sufficient heat and has been vaporized, it is conducted further through the closed refrigerant circuit 140 back to the inlet of the refrigerant compressor 106, thus completing the closed refrigerant circuit 140.

The consolidated heating/cooling core 104 conducts the liquid refrigerant through a second closed path 142. The second closed path 142 is closed because it prevents the liquid refrigerant from being mixed with the other fluid media passing through the consolidated heating/cooling core 104, while permitting heat energy contained in the thermally regulated fluid passing through the consolidated heating/cooling core 104 to be communicated to the liquid refrigerant, thereby vaporizing it.

The consolidated heating/cooling core 104 comprises a third closed path 144 through which the thermally regulated fluid passes. The third closed path 144 prevents the thermally regulated fluid from being mixed with the other fluid media passing through the consolidated heating/cooling core 104, permitting heat energy contained in the thermally regulated fluid to be conveyed to the liquid refrigerant, and permitting heat energy contained in the engine coolant to be conveyed to the thermally regulated fluid over the length of the third closed path 144.

The third closed path 144 is a part of a closed thermally regulated fluid circuit 146. The closed thermally regulated fluid circuit 146 includes the pump 116, which is coupled to the consolidated heating/cooling core 104 to receive the thermally regulated fluid therefrom, and to convey the thermally regulated fluid to a thermally regulated load 148. In this case, the thermally regulated load 148 comprises the battery 112 and the inverter 110. The battery 112 and the inverter 110 include internal heat exchangers to permit heat energy generated in the battery 112 and the inverter 110 to be transmitted from the thermally regulated fluid as necessary to maintain the battery 112 and the inverter 110 at a regulated temperature. The internal heat exchangers also permits heat energy in the thermally regulated fluid to be transmitted to the battery 112 and the inverter 110 as necessary to maintain the battery 112 and the inverter 110 at a regulated temperature.

The surge tank 114 is coupled to the closed thermally regulated fluid circuit 146 to accommodate sudden fluctuations in the fluid flow and fluid pressure of the thermally regulated fluid within the closed thermally regulated fluid circuit 146.

If the temperature in the battery 112 and the inverter 110 are higher than the temperature of the thermally regulated fluid, then heat energy will be conducted into the thermally regulated fluid from the battery 112 and the inverter 110 and the temperature of the battery 112 and the inverter 110 will be correspondingly reduced.

If the temperatures of the battery 112 and the inverter 110 are lower than the temperature of the thermally regulated fluid, then heat energy will be conducted out of the thermally regulated fluid and into the battery 112 and the inverter 110 and the temperature of the battery 112 and the inverter 110 will be correspondingly increased.

Thus the temperature of the thermally regulated load 148 can be regulated by changing the temperature of the thermally regulated fluid.

The ECU 118 is configured to monitor and control the temperature of the thermally regulated load 148 in order to maintain the temperature of the thermally regulated load 148 within a predetermined temperature range.

The ECU 118 is a microprocessor-based electronic control unit of conventional arrangement that includes a digital microprocessor, a non-volatile memory (e.g. ROM) for storing digital instructions that control the operation of the ECU 118 according to a predetermined program, a volatile memory (e.g. RAM) that provides temporary storage of working variables used by the microprocessor in executing its digital instructions, a driver circuit for generating a signal with sufficient power to engage and disengage the electrically actuated clutch 134, and a signal conditioning circuit coupled to the first temperature sensor 120, and the second temperature sensor 122 to receive and condition signals indicative of the temperature of the inverter 110, and the battery 112, temperature sensor 120 respectively.

The temperature sensor 120 is thermally coupled to the inverter 110 to generate an electrical signal indicative of a temperature of the inverter 110.

The temperature sensor 122 is thermally coupled to the battery 112 to generate an electrical signal indicative of a temperature of the battery 112.

The temperature sensor 120 and the temperature sensor 122 are electrically coupled to the signal conditioning circuit of the ECU 118 thereby permitting the ECU 118 to receive signals indicative of the temperature of the inverter 110 and temperature of the battery 112.

The electrically actuated clutch 134 is coupled to the driver circuit of the ECU 118 to permit the driver circuit to selectively engage and disengage the electrically actuated clutch 134 under the command of the ECU 118.

The solenoid valve 124 is similarly coupled to the driver circuit of the ECU 118 to be opened and closed thereby under the command of the ECU 118.

ECU 118 is programmed by the digital instructions to regularly and periodically monitor the signals generated by the temperature sensor 120 and temperature sensor 122. The ECU 118 is configured by the digital instructions to compare the temperatures indicated by these signals with a first predetermined threshold temperature and a second predetermined threshold temperature higher than the first predetermined threshold temperature.

If either of the temperatures indicated by the temperature sensor 120 or the temperature sensor 122 is below the first predetermined threshold temperature, the ECU 118 is programmed by the digital instructions to open the solenoid valve 124, thus permitting the internal combustion engine 102 (by its internal coolant pump) to conduct hot engine coolant through the closed engine coolant circuit 136. The closed engine coolant circuit 136 includes the first closed path 138. Hot engine coolant passing through the first closed path 138 transfers heat energy to the thermally regulated fluid passing through the third closed path 144 which is directly thermally coupled to the first closed path 138. This heat transfer heats the thermally regulated fluid. The now-heated thermally regulated fluid is then conveyed through the closed thermally regulated fluid circuit 146 through the pump 116 and into the battery 112 and the inverter 110. This causes the battery 112 and the inverter 110 to receive thermal energy from the thermally regulated fluid and thereby raises the temperature of the battery 112 and the inverter 110. The increased temperature of the battery 112 and the inverter 110 is communicated to the temperature sensor 122 in the temperature sensor 120, respectively. The temperature sensor 122 and the temperature sensor 120 communicate this elevated temperature to the ECU 118. Eventually, the ECU 118 senses that the temperature of the battery 112 and the inverter 110 are above the first predetermined threshold temperature, and the ECU 118 is programmed responsively to close the solenoid valve 124.

If the ECU 118 determines that the temperature from either the temperature sensor 120 or the temperature sensor 122 is above the second predetermined threshold temperature, the ECU 118 is programmed by its digital instructions to engage the electrically actuated clutch 134, thus compressing the gaseous refrigerant and conducting it into the refrigerant condenser 108, where its heat energy is removed and the refrigerant is condensed to a liquid refrigerant. The liquid refrigerant is then conveyed into the second closed path 142 where heat energy from the thermally regulated fluid passing through the third closed path 144 is conducted into the liquid refrigerant causing it to absorb the heat energy and vaporize. This, in turn, cools the thermally regulated fluid passing through the third closed path 144. The pump 116 circulates this now-cool thermally regulated fluid further through the closed thermally regulated fluid circuit 146 and through the battery 112 and the inverter 110 thereby cooling the battery 112 and the inverter 110. The now-cooler battery 112 and the inverter 110 communicate this reduced temperature to the temperature sensor 122 and the temperature sensor 120, respectively. The temperature sensor 122 and the temperature sensor 120 communicate this reduced temperature to the ECU 118. Eventually, the ECU 118 senses that the temperature of the battery 112 and the inverter 110 are below the second predetermined threshold temperature, and the ECU 118 is programmed by its digital instructions to responsively disengage the electrically actuated clutch 134.

The vehicle heating/cooling system 100 is thereby configured to regulate the temperature of the thermally regulated load 148 (i.e. the temperatures of the battery 112 and the inverter 110) using the consolidated heating/cooling core 104 to regulate the temperature of the thermally regulated fluid.

FIG. 2 is a schematic diagram of a first embodiment of the consolidated heating/cooling core 104. In this embodiment, the first closed path 138, the second closed path 142 and the third closed path 144 conduct each of their respective fluids in parallel through the consolidated heating/cooling core 104. In this arrangement, the first closed path 138, the second closed path 142, and the third closed path 144 are defined by the nested cylinders.

A first cylinder 200 of the consolidated heating/cooling core 104 defines the first closed path 138, and has a fluid flow inlet 202 and a fluid flow outlet 204.

The first cylinder 200 is nested inside and surrounded by a second cylinder 206 of the consolidated heating/cooling core 104. The space between the second cylinder 206 and a third cylinder 212 defines the third closed path 144 and has a fluid flow inlet 208 and a fluid flow outlet 210.

By this arrangement, heat energy is conducted through the wall of the first cylinder 200 from the engine coolant to the thermally regulated fluid passing through the second cylinder 206.

The second cylinder 206 is nested inside and surrounded by the third cylinder 212 of the consolidated heating/cooling core 104. The space between the second cylinder 206 and the third cylinder 212 defines the second closed path 142 and has a fluid flow inlet 214 and a fluid flow outlet 216.

By this arrangement, heat energy is conducted through the wall of the second cylinder 206 from the thermally regulated fluid passing through the second cylinder 206 to the refrigerant passing through the third cylinder 212.

The first cylinder 200, the second cylinder 206, and the third cylinder 212 extend longitudinally, generally parallel to a longitudinal axis 218 of the consolidated heating/cooling core 104. If all of the first cylinder 200, the second cylinder 206, and the third cylinder 212 are right circular cylinders (as shown in FIG. 3), the preferred arrangement is that the first cylinder 200, the second cylinder 206, and the third cylinder 212 be arranged concentric about the longitudinal axis 218.

In the arrangement of FIG. 2, the first closed path 138 and the second closed path 142 are isolated from each other, such that no (or only a limited amount of) heat transfer can occur directly from liquid traveling through the first closed path 138 and liquid traveling through the second closed path 142.

In the arrangement of FIG. 2, all flow through the cylinders is in the same direction. Depending upon the size and spacing of the cylinders and the cooling and heating requirements of the thermally regulated load 148, one, two, or all of the flows can be reversed in flow direction to provide a counter flow regime for improved heat transfer. In such an arrangement, one or more of the fluid flow inlet 202, the fluid flow inlet 208, and the fluid flow inlet 214 would become fluid flow outlets, and one or more of the fluid flow outlet 204, the fluid flow outlet 210, and the fluid flow outlet 216 would become fluid flow inlets.

FIG. 4 is a schematic diagram of a second embodiment of the consolidated heating/cooling core 104.

In this embodiment, the first closed path 138, and the third closed path 144 conduct each of their respective fluids in parallel through a first section 400 of the consolidated heating/cooling core 104. The second closed path 142 and the third closed path 144 conduct each of their respective fluids in parallel through a second section 402 of the consolidated heating/cooling core 104. The first section 400 and the second section 402 are disposed in sequential longitudinal portions of cylinder 410.

In this embodiment also, the second closed path 142 and the third closed path 144 conduct each of their respective fluids in parallel through a second section 402 of the consolidated heating/cooling core 104. In the second section 402, the second closed path 142 and the third closed path 144 are arranged as nested cylinders.

In the first section 400, a first cylinder 404 of the consolidated heating/cooling core 104 defines the first closed path 138 and has a fluid flow inlet 406 (202 in FIG. 1), and a fluid flow outlet 408 (204 in FIG. 1).

The first cylinder 404 is nested inside and surrounded by a second cylinder 410 of the consolidated heating/cooling core 104. The space between the second cylinder 410 and the first cylinder 404 defines the third closed path 144 and has a fluid flow inlet 412 (208 in FIG. 1) and a fluid flow outlet 414 (210 in FIG. 1).

By this arrangement, heat energy is conducted through the wall of the first cylinder 404 from the engine coolant in the closed engine coolant circuit 136 to the thermally regulated fluid passing through the second cylinder 410.

In the second section 402, a third cylinder 416 of the consolidated heating/cooling core 104 defines the second closed path 142 and has a fluid flow inlet 418 (214 in FIG. 1) and a fluid flow outlet 420 (216 in FIG. 1).

Figure 5:
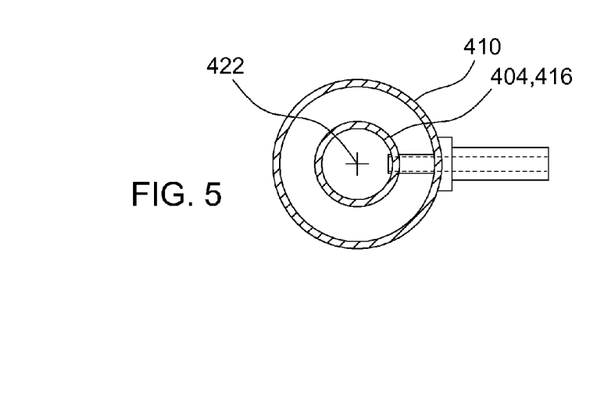
FIG. 5 is a cross-sectional view of the embodiment of FIG. 4 taken at section line 5-5 in FIG. 4.

The first cylinder 404, the second cylinder 410 and the third cylinder 416 extend longitudinally, generally parallel to a longitudinal axis 422 of the consolidated heating/cooling core 104. If all of the first cylinder 200, the second cylinder 206, and the third cylinder 212 are right circular cylinders (as shown in FIG. 5), the preferred arrangement is that the first cylinder 404, the second cylinder 410, and the third cylinder 416 be arranged concentric about the longitudinal axis 422.

In the arrangement of FIG. 4, the first closed path 138 and the second closed path 142 are isolated from each other, such that no (or only a limited amount of) heat transfer can occur directly from liquid traveling through the first closed path 138 and liquid traveling through the second the second closed path 142.

In the arrangement of FIG. 4, all fluid flows through the first closed path 138, the second closed path 142, and the third closed path 144 are in the same flow direction. Depending upon the size and spacing of the cylinders and the cooling and heating requirements of the thermally regulated load 148, one of the fluid flows can be reversed in flow direction to provide a counter flow regime for improved heat transfer.

In such an arrangement, one or more of the fluid flow inlet 406, the fluid flow inlet 412 and the fluid flow inlet 418 would become fluid flow outlets, and one or more of the fluid flow outlet 408, the fluid flow outlet 414, and the fluid flow outlet 420 would become fluid flow inlets. To reverse the flow direction for any one of the first closed path 138, the second closed path 142, and the third closed path 144 as shown in FIG. 2, the conduit connected to its corresponding inlet (as shown in FIG. 2) would be moved to its corresponding outlet (as shown in FIG. 2), and the conduit that was connected to its corresponding outlet would be moved to its corresponding inlet.

It should be understood that the particular embodiments shown and discussed herein are not the only ways in which the invention can exist. They are merely current preferred embodiments of the invention. One skilled in the art of vehicle heating/cooling system design and manufacture can readily see other variations that would also fall within the scope of the appended claims.

For example, a belt and pulley drive arrangement is shown as well as an electrically actuated clutch. Other arrangements may comprise gears, pulleys, shafts, belts, mechanical clutches, hydraulic clutches, hydraulic motors, and hydraulic clutches.

As another example, the thermally regulated load 148 may comprise a radiator disposed to cool and heat ambient air in an operator compartment of the vehicle.

As another arrangement, rather than single concentric cylinders defining the first closed path 138, the second closed path 142, and the third closed path 144, a tube and shell heat exchanger arrangement may be employed in which a first plurality of cylinders extending in parallel define the first closed path 138 and a second plurality of cylinders extending in parallel define the second closed path 142, and a common space inside the shell and surrounding the first plurality of cylinders and the second plurality of cylinders define the third closed path 144. This arrangement has the additional advantage of providing greater tubular surface area for heat transfer than would be provided with the three-cylinder embodiments illustrated in FIG. 2 and FIG. 4.

We claim:

1. A vehicle heating/cooling system (100) for a vehicle comprising:
    an internal combustion engine (102) coupled to a closed engine coolant circuit (136) to recirculate engine coolant therethrough;
    a refrigerant compressor (106) coupled to a closed refrigerant circuit (140) to recirculate refrigerant therethrough, wherein the refrigerant compressor is coupled to the internal combustion engine (102) to be driven thereby;
    a closed thermally regulated fluid circuit (146) to recirculate thermally regulated fluid therethrough; and
    a consolidated heating/cooling core (104) coupled to the closed engine coolant circuit (136), to the closed refrigerant circuit (140) and to the closed thermally regulated fluid circuit (146) to conduct heat energy from the engine coolant into the thermally regulated fluid and to conduct heat energy from the thermally regulated fluid into the refrigerant, wherein the consolidated heating/cooling core (104) defines a first closed path (138) for conducting the engine coolant therethrough, wherein the consolidated heating/cooling core (104) defines a second closed path (142) for conducting the refrigerant therethrough, and wherein the consolidated heating/cooling core (104) defines a third closed path (144) for conducting the thermally regulated fluid therethrough, wherein the first closed path (138), the second closed path (142) and the third closed path (144) are defined by a plurality of cylinders (200, 206, 212, 404, 410, 416), wherein the plurality of cylinders (200, 206, 212) comprises a first cylinder (200), a second cylinder (206), and a third cylinder (212), and further wherein each cylinder of the plurality of cylinders (200, 206, 212) has an inner surface and an outer surface, and further wherein the first cylinder (200) is surrounded by the second cylinder (206) which is surrounded by the third cylinder (212), wherein the first closed path (138) is defined by an inner surface of the first cylinder (200), and further wherein the second closed path (142) is defined by a space between the outer surface of the second cylinder (206) and the inner surface of the third cylinder (212), and further wherein the third closed path (144) is defined by the space between the outer surface of the first cylinder (200) and the inner surface of the second cylinder (206).

2. The vehicle heating/cooling system (100) of claim 1, wherein the plurality of cylinders (200, 206, 212, 404, 410, 416) is concentric.

3. The vehicle heating/cooling system (100) of claim 1, wherein each cylinder of the plurality of cylinders (200, 206, 404, 416) is nested within at least another cylinder of the plurality of cylinders (206, 212, 410).

4. The vehicle heating/cooling system (100) of claim 1, wherein the closed thermally regulated fluid circuit (146) passes through a thermally regulated load (148), and further wherein the thermally regulated load (148) comprises a battery (112).

5. The vehicle heating/cooling system (100) of claim 1, wherein the closed thermally regulated fluid circuit (146) passes through a thermally regulated load (148), and further wherein the thermally regulated load (148) comprises an inverter (110).

6. The vehicle heating/cooling system (100) of claim 1, wherein the consolidated heating/cooling core (104) is a rigid, unitary body.

7. The vehicle heating/cooling system (100) of claim 1, wherein a fluid flow direction through one of the first closed path (138), the second closed path (142) and the third closed path (144) is opposite to a fluid flow direction through the other two of the first closed path (138), the second closed path (142) and the third closed path (144).

8. The vehicle heating/cooling system (100) of claim 1, further comprising:
    a control valve (124) disposed in the closed engine coolant circuit to regulate the flow of engine coolant therethrough: and
    an ECU (118) coupled to the control valve (124) to regulate the amount of heat energy in the engine coolant that is conducted to the thermally regulated fluid within the consolidated heating/cooling core.

9. A consolidated heating/cooling core (104) for a vehicle heating/cooling system (100) of a vehicle, the vehicle heating/cooling system (100) comprising a closed engine coolant circuit (136) for conducting engine coolant therethrough, a closed refrigerant circuit (140) for conducting refrigerant therethrough, and a closed thermally regulated fluid circuit (146) for conducting thermally regulated fluid therethrough, the consolidated heating/cooling core (104) comprising:
    a first closed path (138) for conducting the engine coolant therethrough;
    a second closed path (142) for conducting the refrigerant therethrough; and
    a third closed path (144) for conducting the thermally regulated fluid therethrough,
    wherein the consolidated cooling core is adapted to conduct heat energy from the engine coolant into the thermally regulated fluid and to conduct heat energy from the thermally regulated fluid into the refrigerant, wherein the first closed path (138), the second closed path (142) and the third closed path (144) are defined by a plurality of cylinders (200, 206, 212, 404, 410, 416), wherein the plurality of cylinders (200, 206, 212) comprises a first cylinder (200), a second cylinder (206), and a third cylinder (212), and further wherein each cylinder of the plurality of cylinders (200, 206, 212) has an inner surface and an outer surface, and further wherein the first cylinder (200) is surrounded by the second cylinder (206) which is surrounded by the third cylinder (212), wherein—the first closed path (138) is defined by an inner surface of the first cylinder (200), and further wherein the second closed path (142) is defined by a space between the outer surface of the second cylinder (206) and the inner surface of the third cylinder (212), and further wherein the third closed path (144) is defined by the space between the outer surface of the first cylinder (200) and the inner surface of the second cylinder (206).

10. The consolidated heating/cooling core (104) of claim 9, wherein each cylinder of the plurality of cylinders (200,

206, 212, 404, 410, 416) is concentric with another cylinder of the plurality of cylinders (200, 206, 212, 404, 410, 416).

\* \* \* \* \*